(12) United States Patent
Aono

(10) Patent No.: US 8,683,699 B2
(45) Date of Patent: Apr. 1, 2014

(54) PRODUCTION METHOD OF DISK DRIVE DEVICE FOR CLEANING SUBASSEMBLIES AND DISK DRIVE DEVICE PRODUCED BY SAID PRODUCTION METHOD

(75) Inventor: Mitsuhiro Aono, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 531 days.

(21) Appl. No.: 12/962,526

(22) Filed: Dec. 7, 2010

(65) Prior Publication Data

US 2011/0199706 A1  Aug. 18, 2011

(30) Foreign Application Priority Data

Feb. 12, 2010  (JP) .................. 2010-028972

(51) Int. Cl.
*B21D 53/10* (2006.01)
*G11B 5/82* (2006.01)

(52) U.S. Cl.
USPC ...................................... 29/898.11; 360/135

(58) Field of Classification Search
USPC ......... 29/898.1, 898.11, 898.12, 458, 603.03, 29/603.04; 134/10, 198; 360/135
See application file for complete search history.

(56) References Cited

U.S. PATENT DOCUMENTS 5,208,795 A * 5/1993 Lavinsky et al. ............... 369/72
5,665,473 A * 9/1997 Okoshi et al. ................. 428/457
8,312,617 B2 * 11/2012 Omura et al. .............. 29/603.03

FOREIGN PATENT DOCUMENTS

JP  07-124529  5/1995

\* cited by examiner

*Primary Examiner* — John C Hong
(74) *Attorney, Agent, or Firm* — Blank Rome LLP

(57) ABSTRACT

A production method of a disk drive device includes: an assembling process of assembling a subassembly by incorporating at least a bearing unit in a hub in a clean room; a pouring process of pouring a lubricant in the bearing unit; a cleaning-liquid discharging process of discharging a cleaning liquid to the hub; a cleaning-liquid intake process of taking in the cleaning liquid discharged to the hub; and a sealing process of sealing the subassembly in a seal-material.

19 Claims, 7 Drawing Sheets

PRODUCTION METHOD OF DISK DRIVE DEVICE FOR CLEANING SUBASSEMBLIES AND DISK DRIVE DEVICE PRODUCED BY SAID PRODUCTION METHOD

CROSS-REFERENCE TO RELATED APPLICATION

This application is based upon and claims the benefit of priority from the prior Japanese Patent Application No. 2010-028972, filed on Feb. 12, 2010, the entire content of which is incorporated herein by reference.

BACKGROUND OF THE INVENTION

1. Field of the Invention

The present invention relates to a production method of a disk drive device provided with a bearing unit and to a disk drive device produced by the production method.

2. Description of the Related Art

In recent years, there has been demand for disk drive devices, such as an HDD (Hard Disk Drive), of a smaller size and larger capacity. For example, in a disk drive device that magnetically records data, a recording disk having a recoding track is rotated at high speed, and a magnetic head reads or writes the data while floating over the recoding track, keeping a slight space above the recoding track. In order to provide a disk drive device of a small size and large capacity, the width of the recording track needs to be smaller. In order to realize the miniaturization of the width of the recording track, it is necessary to have an even smaller space between the magnetic head and the recording disk. The size of the space between the magnetic head and the recording disk needs to be extremely small, for example, 10 nm at most.

For the miniaturization of the disk drive devices, magneto-resistance devices (hereinafter, referred to as "MR devices") are used for magnetic heads. Meanwhile, the use of an MR device in an extremely small space may cause thermal asperity failure (hereinafter, referred to as "TA failure") and head crash failure in the magnetic head. More specifically, TA failure is a failure where fine foreign particles on the surface of a recording disk come into contact with an MR device when the magnetic head floats and traces, instantaneously producing heat in the MR device by the kinetic energy of the particles while instantaneously heating or cooling the MR device, such that the resistance value of the MR device changes instantaneously and that the changed resistance value is included in a reproduced signal as noise, which prevents the reproduced signal from being correctly read out.

According to the research conducted by the inventors of the present invention, it is found that TA failure is caused by the attachment of foreign particles (hereinafter, referred to as "particles") of 0.1 μm to several μm, which were attached to the inside of a disk drive device, to the surface of a recording disk by vibration or air flow. Patent document 1 describes a cleaning device that cleans various parts including a base member.

[Patent document 1] Japanese Patent Application Laid-open 7-124529

Even if members such as, for example, a hub or a bearing unit, which constitute a disk drive device are cleaned, a lubricant can stick to the hub when the lubricant is put in the bearing unit after the bearing unit is combined to the hub. For example, a lubricant that is attached to assembly equipment or tools, or to a worker's hands can stick to the hub. The lubricant attached to the hub can be in the form of particles.

The particles that are attached during the assembly as described above cannot be removed by a conventional production method of the disk drive device, and the general standard of the cleanliness inside of a disk drive device is very low. When a lot of particles stay, the possibility that TA failure may occur increases in the case where the gap for a magnetic head to float is made small, hindering a disk drive device from having small size and large capacity.

SUMMARY OF THE INVENTION

In this background, a purpose of the present invention is to provide a technique that improves the cleanliness level of a disk drive device and that keeps the possibility that TA failure may occur to be low when the gap, which is used for a magnetic head to trace, between the magnetic head and a recording disk is made small.

A production method of a disk drive device according to one embodiment of the present invention comprises: an assembling process operative to assemble a subassembly by incorporating at least a bearing unit in a hub in a clean room; a pouring process operative to pour a lubricant in the bearing unit; a cleaning-liquid discharging process operative to discharge a cleaning liquid onto the hub; a cleaning-liquid intake process operative to take in the cleaning liquid discharged onto the hub; and a sealing process operative to seal the subassembly inside a seal-material.

According to the embodiment, the particles attached to the disk drive device through the production processes can be reduced, allowing for the reduction in the possibility that TA failure occurring.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
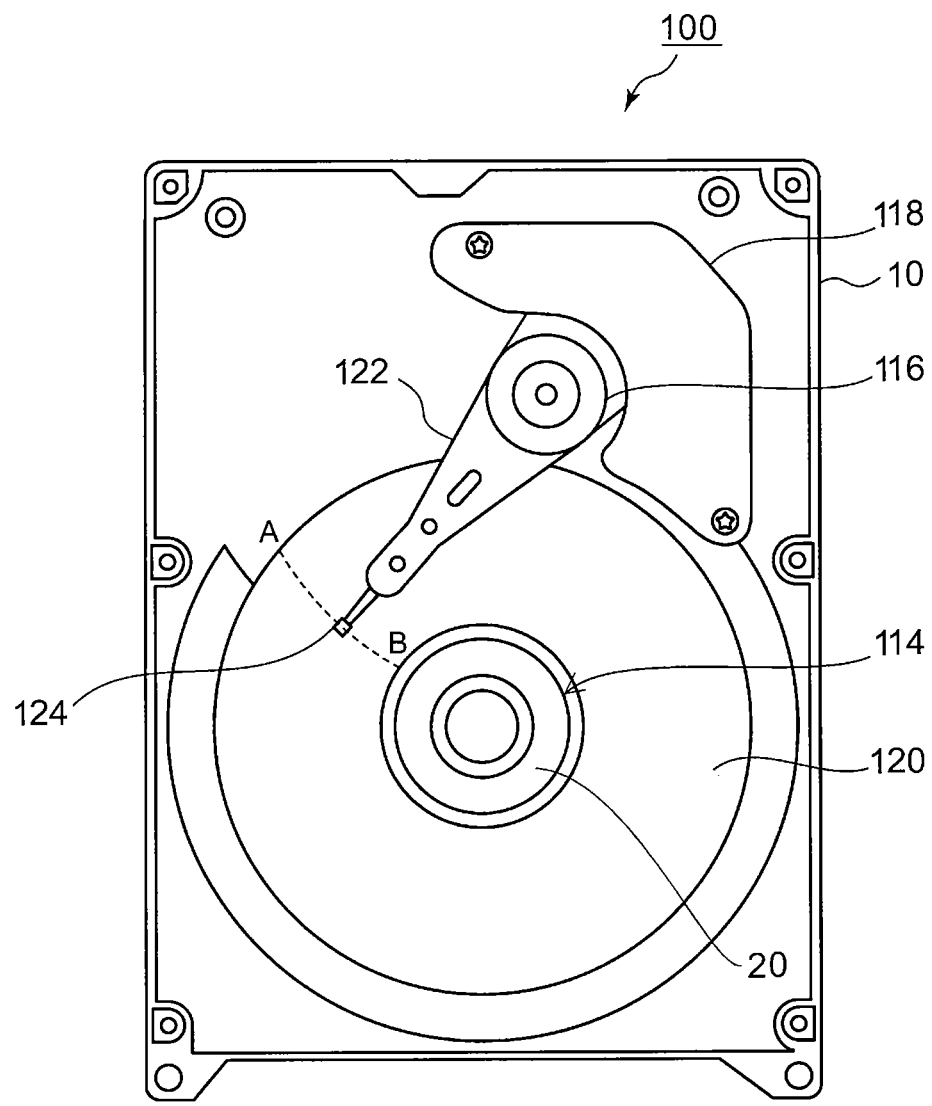
FIG. 1 is a view showing the internal configuration of a disk drive device according to the embodiment.

The invention will now be described by reference to the preferred embodiments. This does not intend to limit the scope of the present invention, but to exemplify the invention.

The invention will now be described in reference to the preferred embodiments (hereinafter, referred to as embodiments). The same or equivalent constituting elements and members illustrated in each drawing shall be denoted by the same reference numerals, and duplicative explanations will be omitted appropriately. The dimensions of members illustrated in each drawing are appropriately enlarged or reduced for easier understanding. Some of members not important for describing the embodiments are omitted from each drawing.

Preferably, the disk drive device according to the embodiment is used as a hard disk drive (often simply referred to as an HDD) provided with a recording disk. Also, the disk drive device may be an HDD.

FIG. 1 is a view showing the internal configuration of a disk drive device 100 according to the embodiment. FIG. 1 shows the disk drive device 100 without a cover so that the internal configuration is exposed.

A brushless motor 114, an arm bearing unit 116, a voice coil motor 118, and a recording disk 120 are mounted on the upper surface of a base member 10. The brushless motor 114 rotatably supports a hub 20 for mounting a recording disk 120. For example, the brushless motor 114 rotationally drives the recording disk 120 on which data can be recorded magnetically. The brushless motor 114 may be replaced by, for example, a spindle motor. The brushless motor 114 is driven by drive currents of three phases U-phase, V-phase, and W-phase. The arm bearing unit 116 supports a swing arm 122 in such a manner that the swing arm 122 swings freely in a range of movement AB. The voice coil motor 118 swings the swing arm 122 in accordance with external control data. At the tip of the swing arm 122, a magnetic head 124 is provided. When the disk drive device 100 is being operated, the magnetic head 124 moves with a slight space overhead of the surface of the recording disk 120, along with the swing of the swing arm 122 in the range of movement AB so as to read and write data. In FIG. 1, a point A corresponds to the position of the outermost recording track of the recording disk 120, and a point B corresponds to the position of the innermost recording track of the recording disk 120. The swing arm 122 may be moved to the waiting position, provided in the outer circumferential side of the recording disk 120, when the disk drive device 100 is in a stopped state.

Figure 2:
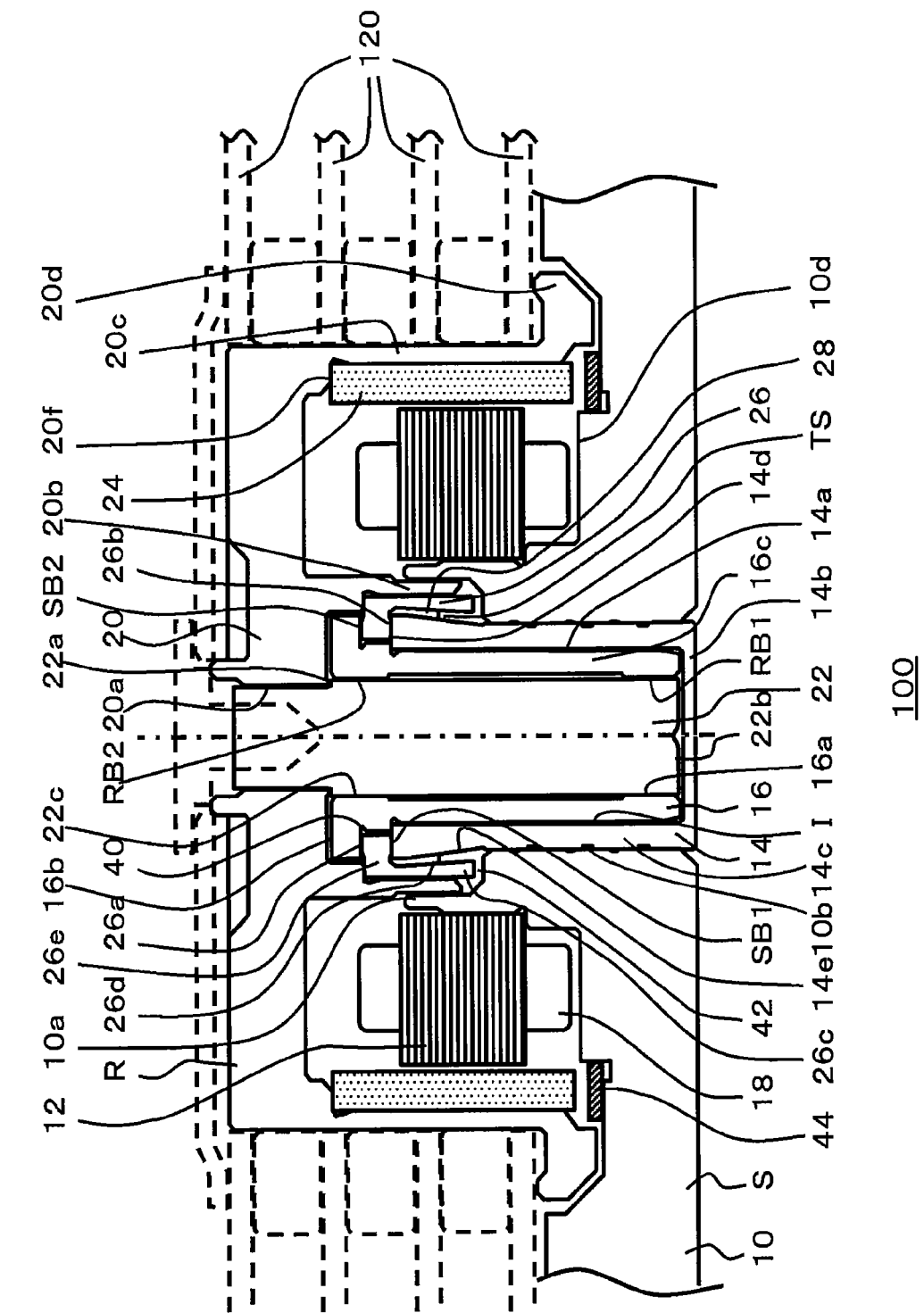
FIG. 2 is a sectional view of the disk drive device according to the embodiment.

FIG. 2 is a sectional view of the disk drive device 100 according to the embodiment. FIG. 2 is a cross section along the axial direction of the shaft 22. The disk drive device 100 includes a fixed body S and a rotating body R. The fixed body S includes a base member 10, a stator core 12, a housing 14, and a sleeve 16. The rotating body R includes a hub 20, a shaft 22, a magnet 24, and a thrust member 26.

The housing 14 has a groove 14a, a bottom portion 14b, a cylindrical portion 14c, an open end portion 14d, and an outer circumferential surface 14e. The sleeve 16 has an inner circumferential surface 16a, a circular projecting portion 16b, and a cylindrical portion 16c. A coil 18 is wound around the stator core 12. The hub 20 has a central hole 20a, a cylindrical hanging portion 20b, an outer circumferential wall portion 20c, an outward extension portion 20d, and a pedestal portion 20f. The shaft 22 has a step portion 22a, a tip portion 22b, and an outer circumferential surface 22c. The thrust member 26 has a thrust upper surface 26a, a thrust lower surface 26b, a hanging portion 26c, an inner circumferential surface 26d, and a flange portion 26e. In the following descriptions, for convenience, the lower portion indicated in the drawings is represented as the bottom, and the upper portion as the top, as a whole.

The base member 10 has a central hole 10b, a cylindrical portion 10a that has a larger inner diameter than that of the central hole 10b and that is provided in the upper part of the central hole 10b, and a base extension portion 10d. The base member 10 holds the housing 14 with the central hole 10b and fixes the stator core 12 to the outer circumferential side of the cylindrical portion 10a surrounding the housing 14. A second area 42 is formed between the outer circumference of the housing 14 and the inner circumference of the cylindrical portion 10a where they face each other. The second area 42 is an annular space. The base member 10 is formed by cutting of an aluminum die cast material or by the press working of an aluminum sheet or a nickel-plated steel sheet.

The stator core 12 is formed by performing insulation coating such as electro-deposition coating or powder coating on the surface thereof after magnetic plates such as ferrosilicon plates are laminated. The stator core 12 is ring-shaped so as to have a plurality of salient poles that are protruding outwards from the ring portion, around each of which the coil 18 is wound. When the disk drive device 100 is, for example, three-phase driven, the number of the salient poles are designed to be nine. The wiring terminal of the coil 18 is soldered on an FPC (Flexible Printed Circuit) arranged on the bottom surface of the base member 10. When a three-phase approximate sinusoidal current flows through the coil 18 via the FPC by a predetermined drive circuit, the coil 18 generates a rotating magnetic field at the salient poles of the stator core 12. The driving magnetic pole of the magnet 24 generates a rotational driving force by the mutual interaction with the rotating magnetic field and rotates a rotating body R.

An attraction plate 44 is fixed on the base member 10 where the base member 10 faces the lower end surface of the ring-shaped magnet 24 via a gap. The attraction plate 44 is a ring member and is formed by pressing, for example, a cold-rolled steel plate or silicon steel plate, which is a soft magnetic material. The surface of the attraction plate 44 is, for example, treated with nickel plating for an anti-corrosion purpose. The attraction plate 44 and the magnet 24 generate a magnetic attraction force in an axial direction between each other. In other words, the attraction plate 44 generates an attraction force that draws the rotating body R toward the base member 10. During the rotation of the rotating body R, a lifting force generated by a bearing structure including a radial dynamic pressure generating site RB and a thrust dynamic pressure generating site SB, which are described hereinafter, the attraction force, and the gravity applied to the entire rotating body R are in balance so that the rotating body R rotates in a non-contact manner with the surrounding members.

The housing 14 has the cylindrical portion 14c surrounding the sleeve 16, the open end portion 14d that is provided towards the hub 20 and that has an end surface in the axial direction, and the bottom portion 14b that seals the end portion on the opposite side of the open end portion 14d and is formed to have an approximate cup shape. The housing 14 having such a shape is arranged so as to clog the lower end of the sleeve 16 and so as to make the upper end thereof protrude above the open end portion 14d. The bottom portion 14b and the cylindrical portion 14c may be integrally formed, or be formed as separate members and fixed to each other. In addition to a copper alloy, a sintered alloy by powder metallurgy, and a stainless steel, the housing 14 may be formed of a resin material such as polyetherimide, polyimide, and polyamide. When a resin material is used to form the housing 14, the housing 14 is preferably configured with a resin material including, for example, a carbon fiber such that the specific resistance of the housing 14 is 106 (Ω·m) or less in order to secure the static electricity removal performance of the disk drive device 100.

A groove 14a is formed in the axial direction on the inner circumferential surface of the housing 14. The groove 14a becomes a communication hole through which both ends of the housing 14 communicate, when fitting the sleeve 16 into the cylindrical portion 14c. The communication hole becomes the communication passage I with the lubricant 28 being filled therein. The cross-sectional shape of the groove 14a is recessed arc-shape or rectangular shape.

The sleeve 16 is fixed to the inner circumferential surface of the housing 14 by adhesion or press-fitting and is fixed coaxially with the central hole 10b of the base member 10. The sleeve 16 has a shape of connecting a cylindrical portion 16c housing and supporting the shaft 22 and a circular projecting portion 16b extending outwardly in the radial direction from the end portion of the cylindrical portion 16c on the side of the hub 20. The inner circumferential surface 16a of the sleeve 16 surrounds the shaft 22. A radial space portion is formed between the inner circumferential surface 16a of the sleeve 16 and the outer circumferential surface 22c of the shaft 22, and a first radial dynamic pressure generating site RB1 and a second radial dynamic pressure generating site RB2, which generate a radial dynamic pressure, are provided in the radial space portion. The circular projecting portion 16b and the cylindrical portion 16c may be integrally formed, or may be formed as separate members and fixed to each other. A first area 40 is formed between the circular projecting portion 16b and the open end portion 14d of the housing 14. The first area 40 is an annular space. The sleeve 16 can be formed of a copper alloy, a sintered alloy by powder metallurgy, a stainless steel, etc. The sleeve 16 may be also formed of a resin material such as polyetherimide, polyimide, and polyamide. When a resin material is used to form the sleeve 16, the sleeve 16 is preferably configured with a resin material including, for example, a carbon fiber such that the specific resistance of the sleeve 16 is 106 (Ω·m) or less in order to secure the static electricity removal performance of the disk drive device 100.

The hub 20 is configured to include the central hole 20a provided in the central portion thereof, the cylindrical hanging portion 20b provided so as to surround the central hole 20a, the outer circumferential wall portion 20c arranged outside the cylindrical hanging portion 20b, and the outward extension portion 20d extending outwards from the lower part of the outer circumferential wall portion 20c. The hub 20 has an approximate cup shape and a soft magnetic property and is, for example, made of steel materials such as SUS430F. The hub 20 is formed in a predetermined shape by, for example, press working or cutting of a steel plate. For example, the stainless steel having a product name of DHS1, which is provided by Daido Steel Co., Ltd., produces small amount of out gas and is easy to be processed. For these reasons, the stainless steel is preferable as a material used for the hub 20. Similarly, the stainless steel having a product name of DHS2 is even more preferable as a material used for the hub 20 in that it has good corrosion resistance.

The thrust member 26 is fixed on the inner surface of the cylindrical hanging portion 20b of the hub 20. The magnet 24 is fixed on the inner surface of the outer circumferential wall portion 20c. The magnet 24 is fixed coaxially with the shaft 22 so as to face, in a radial direction, the salient poles of the stator core 12 that is fixed to the base member 10. The recording disk 120 is mounted on the outward extension portion 20d such that the central hole thereof is engaged with the outer circumferential surface of the outer circumferential wall portion 20c.

The shaft 22 is fixed to the central hole 20a of the hub 20. The shaft 22 is press-fitted into the central hole 20a when assembling. A step portion 22a is provided on the outer circumferential surface of the shaft 22, and the hub 20 is restricted in the downward movement in the axial direction by the step portion 22a and is integrated with the shaft 22 at a predetermined right angle. The shaft 22 is interpolated in the sleeve 16. The shaft 22 is formed of a stainless material.

The thrust member 26 has a flange portion 26e surrounding the sleeve 16 and the hanging portion 26c surrounding the housing 14. A part of the flange portion 26e is fixed to the interior wall of the cylindrical hanging portion 20b with an adhesive, and the hanging portion 26c is joined to the outer edge portion of the flange portion 26e and also fixed to the interior wall of the cylindrical hanging portion 20b with an adhesive. That is, the outer circumferential surface of the hanging portion 26c is fixed to the inner circumferential surface of the cylindrical hanging portion 20b with an adhesive. With such a structure, the flange portion 26e surrounds the outer circumference of the cylindrical portion 16c of the sleeve 16 through a gap and is arranged below the circular projecting portion 16b thought a narrow gap. Further, the thrust member 26 is rotated integrally with the hub 20, and the flange portion 26e is rotated in the first area 40, and the hanging portion 26c is rotated in the second area 42, at the time.

As shown in FIG. 2, the flange portion 26e has a thrust upper surface 26a and a thrust lower surface 26b and has a shape that is thin in the axial direction. The hanging portion 26c extends downwards in the axial direction from the outer circumference end of the flange portion 26e. The thrust lower surface 26b and the upper end surface of the open end portion 14d of the housing 14 configure the first thrust dynamic pressure generating site SB1, and the thrust upper surface 26a and the lower surface of the circular projecting portion 16b configures the second thrust dynamic pressure generating site SB2. The thrust member 26 is formed by joining the flange portion 26e and the hanging portion 26c together, and, as shown in FIG. 2, has a so-called inverted L-shaped cross section in which the alphabetical capital letter "L" is inverted upside down. The inner circumferential surface 26d of the hanging portion 26c has a tapered shape, the radius of which becomes gradually smaller toward the side opposite to the side on which the flange portion 26e is formed, and forms a capillary seal portion TS, which is described hereinafter. The thrust member 26 can be, for example, formed easily and inexpensively by press working of a plate-like metallic material. Further, even when the thrust member 26 becomes small in size and thin, the thrust member 26 can still be manufactured so as to have good dimension accuracy by press working or the like. As a result, such a shape contributes to the miniaturization and light weight of the disk drive device 100.

In addition to configuring the thrust dynamic pressure generating site, the thrust member 26 has a function of preventing the rotating body R from coming off the fixed body S. When the rotating body R and the fixed body S relatively move by an impact, the flange portion 26e comes into contact with the lower surface of the circular projecting portion 16b. As a result, the thrust member 26 receives a stress in the direction in which the thrust member 26 is detached from the cylindrical hanging portion 20b to which the thrust member 26 is fixed. If the joint distance between the hanging portion 26c and the cylindrical hanging portion 20b is small, the joint strength becomes weak, causing a possibility that the joint therebetween may be destroyed by even a small impact to be high. That is, as the joint distance between the hanging portion 26c and the cylindrical hanging portion 20b becomes longer, the joint therebetween becomes stronger against an impact.

On the other hand, as the flange portion 26e becomes thicker, the capillary seal portion TS becomes shorter, causing the capacity of the lubricant 28 that can be held in the capillary seal portion TS to be small. Therefore, there occurs a possibility that the lubricant 28 may be in shortage after the lubricant 28 is scattered through impact. Due to such shortage of the lubricant, a fluid dynamic bearing is deteriorated in its function, likely causing a malfunction such as burn-in. Thus, the capillary seal portion TS in the disk drive device 100 of the embodiment is designed to be long in the up-down direction by thinning the flange portion 26e. As a result, an amount of the lubricant 28 that can be held becomes large, and the disk drive device 100 is configured such that the lubricant 28 is hardly in shortage even when the lubricant 28 is scattered. In other words, the distance of the thrust member 26 in the axial direction is designed to be large relative to the hanging portion 26c and small relative to the flange portion 26e. The amount of the lubricant 28 that can be held is large; therefore, the lubricant 28 is hardly in shortage even when the lubricant 28 is reduced by evaporation.

The magnet 24 is provided so as to be fixed to the inner circumference of the outer circumferential wall portion 20c and to face the outer circumference of the stator core 12 through a narrow gap. The magnet 24 is formed of an Nd—Fe—B (Neodymium-Ferrum-Boron) material, the surface thereof being treated with electro-deposition coating and splay coating, and the inner circumference surface side thereof being magnetized for driving in twelve poles in the circumferential direction.

A detailed description will be now made regarding a dynamic pressure bearing of the disk drive device 100. The dynamic pressure bearing acting in the radial direction has a plurality of radial dynamic pressure generating sites, and the plurality of radial dynamic pressure generating sites are configured to include the outer circumferential surface 22c of the shaft 22, the inner circumferential surface 16a of the sleeve 16, and the lubricant 28 such as oil or the like filled in the space between these two surfaces. The first radial dynamic pressure generating site RB1 and the second radial dynamic pressure generating site RB2 support the rotating body R by generating dynamic pressure in the radial direction. The first radial dynamic pressure generating site RB1 and the second radial dynamic pressure generating site RB2 have a first radial dynamic pressure groove and a second radial dynamic pressure groove for generating dynamic pressure on at least one of the outer circumferential surface 22c and the inner circumferential surface 16a, which face each other.

On the other hand, the dynamic pressure bearing in the thrust direction has the first thrust dynamic pressure generating site SB1 and the second thrust dynamic pressure generating site SB2, as shown in FIG. 2. The first thrust dynamic pressure generating site SB1 and the second thrust dynamic pressure generating site SB2 have a thrust dynamic pressure groove (not shown) for generating a dynamic pressure, on at least one of the surfaces that configure a gap in the axial direction. The thrust dynamic pressure groove is formed into, for example, a spiral-like or herringbone-like shape, which is similar to the shape of the radial dynamic pressure groove. With the rotation of the rotating body R, the thrust dynamic pressure generating site SB as a whole generates a dynamic pressure in a pump-in direction, which is the direction of pumping the lubricant 28 from the capillary seal portion TS to the inside of the bearing, and exerts a lifting force in the axial direction on the rotating body R by the pressure thus generated. The lubricants 28 filled in the gaps in the first radial dynamic pressure generating site RB1, the second radial dynamic pressure generating site RB2, the first thrust dynamic pressure generating site SB1, and the second thrust dynamic pressure generating site SB2 are used in common with one another and are prevented from leaking out by being sealed with the capillary seal portion TS.

The capillary seal portion TS is configured by the outer circumferential surface 14e of the housing 14 and by the inner circumferential surface 26d of the thrust member 26. The outer circumferential surface 14e has an inclined surface, the diameter of which becomes gradually smaller in the downward direction. On the other hand, the inner circumferential surface 26d facing thereto also has an inclined surface, the diameter of which becomes gradually smaller in the downward direction. With such a structure, the outer circumferential surface 14e and the inner circumferential surface 26d form the capillary seal portion TS, the gap between the surfaces becomes gradually wider in the downward direction. Herein, because an amount of the lubricant 28 to be filled in the gap is set such that the boundary surface (hereinafter, referred to as a "vapor-liquid interface") between the lubricant 28 and ambient air is located in the middle of the capillary seal portion TS, the lubricant 28 is sealed with the capillary seal portion TS by capillarity. As a result, the lubricant 28 is prevented from leaking out. The lubricant 28 is filled in a lubricant storing portion including, for example, the spaces forming the first radial dynamic pressure generating site RB1, the second radial dynamic pressure generating site RB2, the first thrust dynamic pressure generating site SB1, and the second thrust dynamic pressure generating site SB2, the space between the housing 14 and the thrust member 26, and the space between the circular projecting portion 16b and the hub 20. The vapor-liquid interface of the lubricant storing portion of the fluid dynamic bearing is provided in the area formed between the base member 10 and the hub 20.

As stated above, the capillary seal portion TS is designed such that the inner circumferential surface 26d thereof, which is the outside inclined surface, has a diameter that becomes gradually smaller in the downward direction. Thereby, with the rotation of the rotating body R, a centrifugal force is exerted on the lubricant 28 such that the lubricant 28 is moved toward the inside of the lubricant storing portion, preventing, more surely, the lubricant 28 from leaking out.

Since the upper end of the first radial dynamic pressure generating site RB1 and the lower end of the second radial dynamic pressure generating site RB2 are communicated with each other by the communication passage I, the whole pressure balance can be maintained at a good level even if the pressure balance between both sides is disrupted since the balance can be quickly regained. Further, even if the balance between the dynamic pressures of the radial dynamic pressure generating site and the thrust dynamic pressure generating site is disrupted by a disturbance such as an force from outside exerted on the rotating body R, the pressures are instantly averaged to maintain the balance. As a result, a floating amount of the rotating body R is stabilized relative to the fixed body S, allowing for the disk drive device 100 to have high-reliability.

Figure 3:
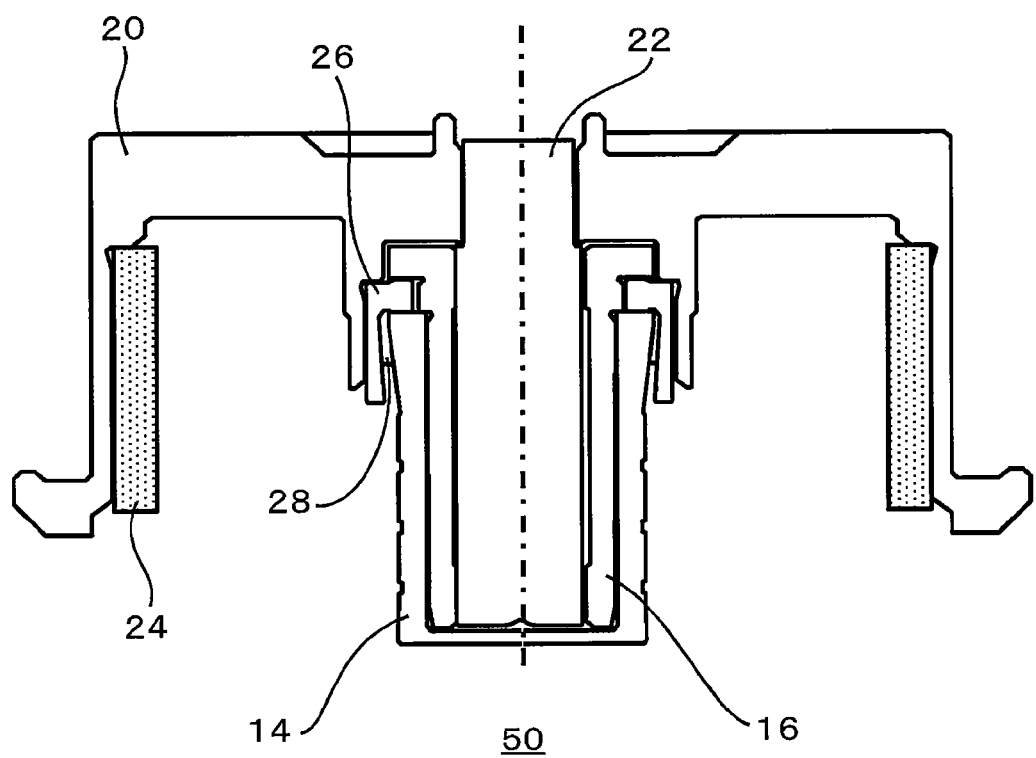
FIG. 3 is a sectional view showing a first subassembly of the disk drive device according to the embodiment.

FIG. 3 is a sectional view showing a first subassembly 50 of the disk drive device 100 according to the embodiment. The subassembly 50 is an intermediate product in the process of producing the disk drive device 100. The first subassembly 50 is assembled by joining the hub 20 to a bearing unit having the housing 14, the sleeve 16, the shaft 22, the magnet 24, and the thrust member 26.

The first subassembly 50 is configured to include the housing 14, the sleeve 16, the hub 20, the shaft 22, the magnet 24, and the thrust member 26. The first subassembly 50 has the first radial dynamic pressure generating site RB1, the second radial dynamic pressure generating site RB2, the first thrust dynamic pressure generating site SB1, the second thrust dynamic pressure generating site SB2, the capillary seal portion TS, and the communication passage I.

A second subassembly of the disk drive device 100 is the housing 14 of the first subassembly 50 fixed, by adhesion or press-fitting, to the central hole 10b of the base member 10 in which the coil 18 and the stator core 12 are installed. In other words, the second subassembly is provided with the base member 10, the stator core 12, the coil 18, and the first subassembly 50 and is an intermediate product in the process of producing the disk drive device 100. The disk drive device 100 is completed by installing, in the second subassembly, the recording disk 120, the magnetic head 124, the swing arm 122, the arm bearing unit 116, and a voice coil motor 118, and a cover that covers the entire body. The hub 20 of the first subassembly 50 and the hub 20 of the second subassembly are to be cleaned.

Figure 4:
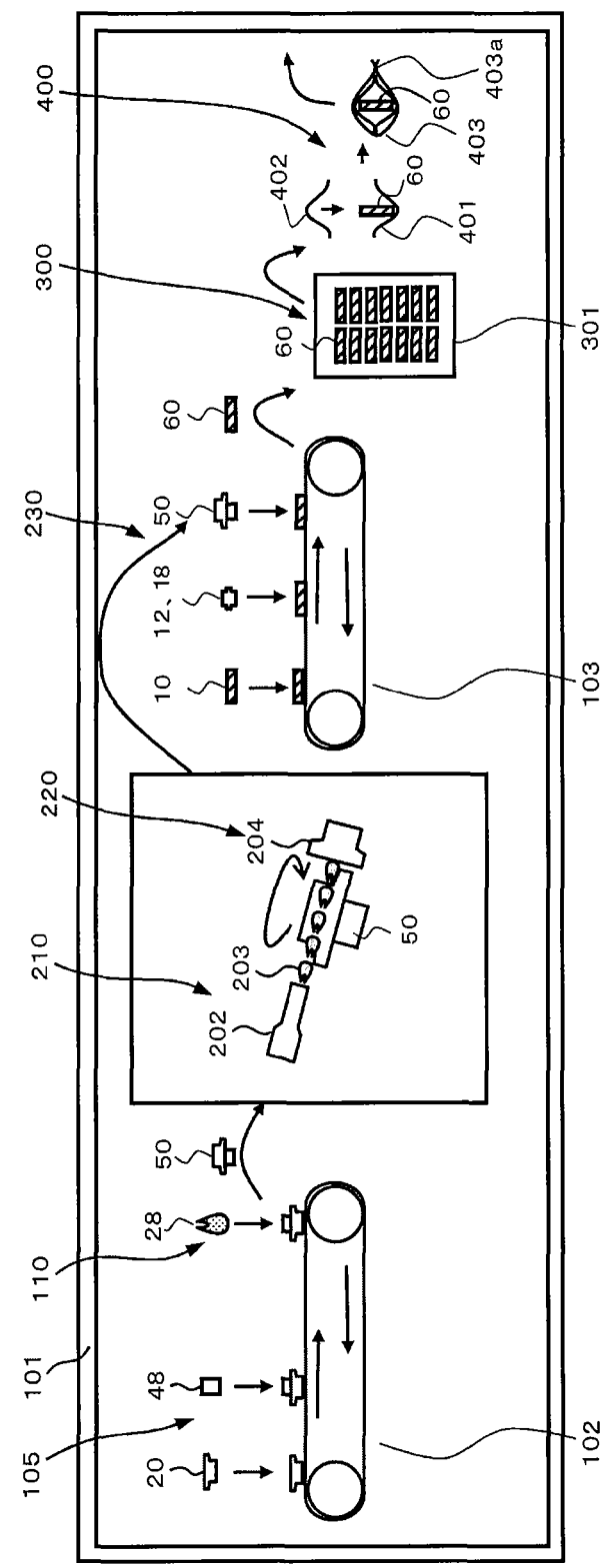
FIG. 4 is a view showing each process of a production method of the disk drive device according to the embodiment.

FIG. 4 is a view showing each process of a production method of the disk drive device 100 according to the embodiment. In FIG. 4, the production processes proceed from left to right. The production processes of the disk drive device 100 include a first subassembly assembling process 105, a pouring process 110 of pouring the lubricant 28, a cleaning-liquid discharging process 210, a cleaning-liquid intake process 220, a second subassembly assembling process 230, a drying process 300, and a sealing process 400. A clean room 101 is filled with purified air.

A carrier device 102 is provided in the clean room 101. For example, the carrier device 102 is a belt conveyor. The hub 20, the base member 10, and the like are delivered to the clean room 101 via a service hatch (not shown). In the first subassembly assembling process 105, the first subassembly 50 is assembled by incorporating at least the bearing unit 48 into the hub 20. In the pouring process 110, the lubricant 28 is poured into the first subassembly 50. The lubricant 28 is often included in the bearing unit 48 before the bearing unit 48 is joined to the hub 20.

The first subassembly 50 is transferred to undergo the cleaning-liquid discharging process 210 by a transfer means. In the cleaning-liquid discharging process 210, a cleaning liquid 203 is discharged from a discharge port 202 onto the hub 20. The cleaning liquid 203 is preferred in that depletion by evaporation is small when the boiling point thereof is at least 40 degrees Celsius under atmospheric pressure. The cleaning liquid 203 is preferred in that the cleaning liquid 203 easily volatilizes so as to facilitate the removal thereof when the boiling point thereof is at most 90 degrees Celsius under atmospheric pressure.

In addition to the hydrocarbon cleaning liquids such as hexane, the cleaning liquid 203 may be various types of cleaning liquids. For example, the use of an alcohol cleaning liquid such as isopropanol is advantageous in that the cleaning liquid has low toxicity and the flash point thereof is relatively high. Particles may be included in the cleaning liquid 203. To cope with this, the particles included in the cleaning liquid 203 are removed prior to the discharge of the cleaning liquid 203. For example, filtration of the cleaning liquid 203 with use of a proper filter is preferred in that the probability of the particles attaching to the first subassembly 50 is reduced. Cleaning with use of low-temperature cleaning liquid 203 increases the viscosity of the lubricant 28 that stays on the hub 20, and it can be difficult to remove the lubricant 28. Therefore, it is preferred to set the temperature of the cleaning liquid 203 to be at least 23 degrees Celsius so as to prevent the viscosity of the lubricant 28 from increasing. Also, it is preferred to set the temperature of the cleaning liquid 203 to be at most 40 degrees Celsius so as to prevent the cleaning liquid 203 from evaporating. A detailed description is now given of the cleaning-liquid discharging process 210 and the cleaning-liquid intake process 220 by using FIG. 5.

Figure 5:
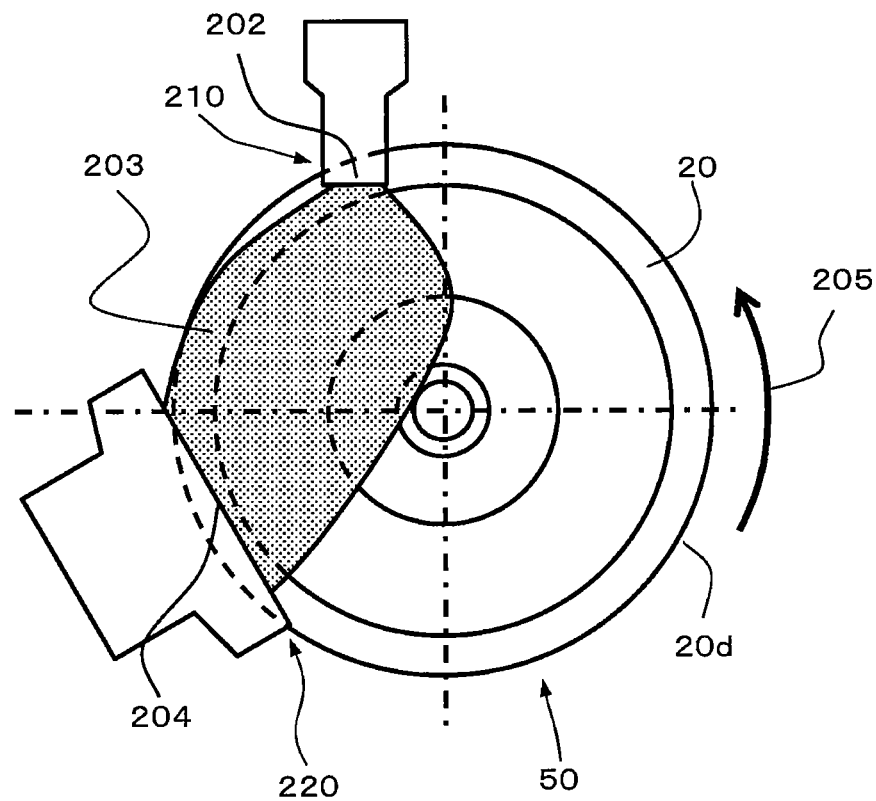
FIG. 5 is a view showing a cleaning-liquid discharging process and a cleaning-liquid intake process of a production method of the disk drive device according to the embodiment.

FIG. 5 is a view showing the cleaning-liquid discharging process 210 and the cleaning-liquid intake process 220 of the production method of the disk drive device 100 according to the embodiment. The figure shows the condition where the cleaning liquid 203 is discharged and then taken in on the top surface of the hub 20. The discharge port 202 and an inlet port 204 are arranged in a non-contact manner so that the particles do not attach to the hub 20.

In the cleaning-liquid discharging process 210, the discharge port 202 of the cleaning liquid 203 is arranged pointedly in a predetermined position of the hub 20, and the cleaning liquid 203 is discharged from the discharge port 202. This allows for the cleaning liquid 203 to be efficiently discharged in a desired position of the hub 20.

The inventors of the present invention found that the main cause of TA failure is the particles attached to the area of the hub 20 where the recording disk 120 comes into contact when the recording disk 120 is mounted on the hub 20. In the cleaning-liquid discharging process 210, the cleaning liquid 203 is discharged so that at least the cleaning liquid 203 reaches the area of the hub 20 where the recording disk 120 comes into contact when the recording disk 120 is mounted on the hub 20. This allows for the particles, which can cause TA failure, to be effectively removed. In the embodiment, it is ensured that the cleaning liquid 203 reaches at least the outward extension portion 20d and the outer circumferential wall portion 20c, which is formed continuously with the outward extension portion 20d. Furthermore, the cleaning liquid 203 may be discharged so that the cleaning liquid 203 reaches at most midway to the top surface of the hub 20.

When discharging the cleaning liquid 203 on the hub 20, the hub 20 is rotated in the direction shown by an arrow 205 so that the cleaning liquid 203 spreads on the top surface of the hub 20 outwardly in the radial direction along the circumferential direction. The hub 20 is rotated so that the cleaning liquid 203 discharged from the discharge port 202 moves toward the inlet port 204. This reduces the unevenness of cleaning and is advantageous in that the entire hub 20 can be cleaned.

If the rotation speed of the hub 20 is at least 100 r/m, the effect of the cleaning liquid 203 spreading over the hub 20 can be ensured. A rotation speed of the hub 20 of at least 500 r/m is advantageous in that the work time is shortened. A rotation speed of the hub 20 of at least 1000 r/m is advantageous in that the work time is further shortened. The hub 20 is preferred in that the possibility of damaging the bearing unit 48 is reduced by setting the rotational speed of the hub 20 to be at most the preset rotational speed of the disk drive device 100 during the practical operation.

The hub 20 may be vibrated when the cleaning liquid 203 is discharged to the hub 20. This spreads the cleaning liquid 203 on the hub 20, reducing the unevenness of the cleaning. The vibration allows for the particles to be easily separated, allowing for effective cleaning.

As shown in FIG. 4, the hub 20 is tilted when the cleaning liquid 203 is discharged in the cleaning-liquid discharging process 210. In combination with the rotation of the hub 20, the cleaning liquid 203 can flow in one direction, and the cleaning liquid 203 can be effectively directed toward the inlet port 204. Also, the unevenness of the cleaning can be reduced. The inclination angle of the hub 20 of at least five degrees ensures the effect of the cleaning liquid 203 flowing over the hub 20. The inclination angle of at most 45 degrees is preferred in that the cleaning liquid 203 flows effectively over the hub 20 without flowing rapidly.

In the cleaning-liquid intake process 220, the inlet port 204 of the cleaning liquid 203 is then arranged pointedly in a predetermined position of the hub 20, and the cleaning liquid 203 is taken in through the inlet port 204. The inlet port 204 is a vacuum nozzle. In the embodiment, the inlet port 204 is provided in the direction of the discharged cleaning liquid 203 spreading and flowing so as to intake the cleaning liquid 203. This allows for the lubricant 28 attached to the hub 20 to be taken in through the inlet port 204 and thus removed along with the cleaning liquid 203. Since the pressure around the inlet port 204, which is a vacuum nozzle, is decreased, the boiling point of the cleaning liquid 203 is lowered, and the volatilization is thus promoted. The size of the inlet port 204 may be at least the radius of the hub 20. This allows for the cleaning liquid 203, which is spreading, to be easily taken in.

When the discharge port 202 and the inlet port 204 are located too far from each other, the cleaning liquid 203 can scatter due to a centrifugal force or the like. As shown in FIG. 5, the discharge port 202 and the inlet port 204 are both arranged on the upper side of either one of the areas obtained by dividing the top surface of the hub 20 into half. This reduces the amount of the cleaning liquid 203 scattering outwards. More preferably, the inlet port 204 may be arranged in the upper side area of the hub 20 in the range of approximately 120 degrees at most from the discharge port 202 in the rotational direction of the hub 20. The respective positions are represented by the centers of the respective opening portions of the discharge port 202 and the inlet port 204.

After the cleaning, the first subassembly 50 is then moved to the carrier device 103 where the second subassembly assembling process 230 is performed. In the second subassembly assembling process 230, the outer circumferential surface of the housing 14 of the first subassembly 50 is fit into the central hole 10*b* of the base member 10 and fixed by, for example, adhesion or press-fitting so as to assemble the second subassembly 60. The base member 10 is placed on the carrier device 103, and the stator core 12 and the coil 18 are incorporated in the base member 10. The subassembly 50 is then incorporated. The previously-described cleaning-liquid discharging process 210 and the cleaning-liquid intake process 220 may be performed on the second subassembly 60. This allows for the particles attached to the hub 20 during the second subassembly assembling process 230 to be removed.

If the cleaning liquid 203 stays on the surface of the hub 20 after the cleaning-liquid intake process 220, the remaining cleaning liquid 203 can react with the hub 20 and alter the surface of the hub 20. The altered part of the surface of the hub 20 can be detached and become particles that can cause TA failure. The production method of the disk drive device 100 according to the embodiment includes a drying process 300 of drying the remaining cleaning liquid 203 in the second subassembly 60.

The assembled second subassembly 60 is first moved in a high-temperature chamber 301. The inside of the high-temperature chamber 301 is filled with purified air that is maintained at 60-120 degrees Celsius. The second subassembly 60 is kept inside the high-temperature chamber 301 for 60-180 minutes and dried while being heated. The remaining cleaning liquid 203 can be effectively removed by drying while heating.

Setting the period in which the second subassembly 60 is kept in the high-temperature chamber 301 for at least 60 minutes allows the remaining cleaning liquid 203 to be removed so as to suppress the alteration of the surface of the second subassembly 60. Setting the period in which the second subassembly 60 is kept in the high-temperature chamber 301 for at most 180 minutes prevents the efficiency of work from being reduced. Keeping the internal temperature of the high-temperature chamber 301 at least 60 degrees Celsius allows the drying time to be short, and keeping the internal temperature of the high-temperature chamber 301 at most 120 degrees Celsius can prevent the lubricant 28 in the bearing unit 48 from evaporating.

There is a possibility that particles floating in the air reattach to the second subassembly 60 after the drying process 300. There is also a possibility that water in the air reacts with the hub 20 or the base member 10 and alters the surface thereof. The production method of the disk drive device 100 according to the embodiment has a sealing process 400 of enclosing the second subassembly 60 in a seal-material in a space with purified air. This allows for the reduction of the possibility of the reattachment of the particles and the possibility of the surface of the second subassembly 60 being altered.

After the drying process 300, the second subassembly 60 is transferred to undergo the sealing process 400. The seal-material has a tray 401, a tray 402, and a pouch 403 having predetermined air-tightness. In the sealing process 400, the second subassembly 60 is sandwiched by the tray 401 and the tray 402 such that the tray 401 and the tray 402 surround the entire second subassembly 60. The second subassembly 60 sandwiched by the trays is wrapped in the pouch 403. The air inside the pouch 403 is then removed, and the opening 403*a* of the pouch 403 is closed. The seal-material having a double structure further ensures the sealing. The use of a relatively solid tray as the internal seal-material reduces the area of the seal-material that comes into contact with the second subassembly 60, thus reducing the possibility of the attachment of particles from the seal-material.

For example, forming the tray 401 by using PET (PolyEthyleneTerephthalate) allows the tray 401 to have a hardness lower than that of the hub 20 and that of the base member 10, so as not to damage the second subassembly 60. A seal-material formed of PET is advantageous in that predetermined air-tightness is easily ensured. For example, a method of closing the opening 403*a* of the pouch 403 by thermal compression bonding is advantageous in that particles are not likely to be produced when closing the opening 403*a*. The "predetermined air-tightness" means air-tight quality where the internal pressure of the pouch 403 is at most 0.9 atm after being left in the atmosphere for 24 hours when the initial internal pressure of the pouch 403 is 0.8 atm.

After the sealing process 400, the second subassembly 60 exits via an exit hatch (not shown). The second subassembly 60 is transferred to undergo a final assembly process, and the recording disk 120, the magnetic head 124, the swing arm 122, the arm bearing unit 116, and a voice coil motor 118 are installed in a clean space. A top cover that covers the entire body is then installed in a clean space so as to complete the disk drive device 100.

Regarding the second subassembly 60, there is a possibility that air leaks into a sealed area of the second subassembly 60 during the production process thereof. Specifically, the sealed area includes a part where the housing 14 of the first subassembly 50 is fit into the central hole 10*b* of the base member 10. In other words, the sealed area is an area where the base member 10 and the bearing unit 48 are joined together. For example, there is a possibility that air will leak when the hub 20 is vibrated during the cleaning-liquid discharging process 210. Even a small amount of air leakage in the second subassembly 60 can cause unpurified air containing particles to enter the assembled disk drive device 100, possibly causing TA failure.

To cope with this, an air-leakage checking process of checking whether air is leaking into the sealed area of the second subassembly 60 may be included prior to the sealing process 400 after the drying process 300. With this, a second subassembly 60 into which air has leaked can be determined to be defective. The air-leakage checking process is performed after the drying process 300.

Specifically, a predetermined space is set by the second subassembly 60 and a space defining member, and the predetermined space is filled with a predetermined gas having a pressure higher than a predetermined pressure. Whether air is leaking in the second subassembly 60 is then checked based on the rate of decrease of the pressure in the predetermined space and on a pre-set reference. In other words, a pre-set high pressure is applied in the sealed area of the second subassembly 60, and whether or not the second subassembly 60 can substantially maintain the airtight state of the sealed area is checked. The method is advantageous in that particles are not likely to be produced. The predetermined gas may be purified air in the air-leakage checking process. The predetermined pressure may be the pressure inside the clean room or may be the atmospheric pressure.

Even when there is an extremely small amount of air leakage in the sealed area of the second subassembly 60, an air leakage can possibly become more serious due to heat expansion or the change with the passage of time. Thus, there is a demand for finding, as much as possible, even a small amount of air leakage. To cope with this, the predetermined gas may contain a gas, which has a molecular weight smaller than that of nitrogen, in a percentage larger than the percentage contained in the atmosphere. A gas having a small molecular weight also has a small molecule size. Thus, such a gas can pass through an extremely small gap. For example, helium is an inert monatomic molecule, and the molecular weight thereof is as small as one-seventh that of nitrogen. For this reason, a smaller gap can be confirmed by using, as the predetermined gas, a gas containing a lot of helium. For example, the predetermined gas may contain helium in a percentage of at least 50 percent. Also, helium may be used as the predetermined gas. This allows the predetermined gas filled in the predetermined space to escape through a small gap, allowing for the detection of an extremely small amount of air leakage. Thus, whether or not there is any air leakage can be checked in a shorter time.

During the production process of the disk drive device 100, the winding of the coil 18 of the second subassembly 60 can be disconnected. When the winding of the coil 18 is disconnected, the rotations becomes unstable. In the worst case, there is a possibility that the disk drive device 100 does not operate. Therefore, a resistance-value checking process of checking the resistance value of the coil 18 may be included prior to the sealing process 400 after the drying process 300. This allows for the disconnection of the winding of the coil 18 to be detected.

More specifically, the terminal of the FPC of the second subassembly 60 is connected to a drive circuit for checking the resistance value of the coil 18. The drive circuit is driven, and whether the resistance value of the coil 18 is appropriate is checked based on the reference pre-set in accordance with the magnitude of the current and the state of the current fluctuation detected at the time of rotation. The method is advantageous in that particles are not likely to be produced.

Further, there is a goal of improving the cleanliness level of the disk drive device 100. In order to achieve this goal, the production process of the disk drive device 100 may include an air cleaning process of cleaning the second subassembly 60 by spraying purified air while applying vibration or impact. For example, applying vibration or impact to the second subassembly 60 lets the attached particles come off, and spraying purified air then separates the particles, which have come off, from the second subassembly 60. The particles separated from the second subassembly 60 are then sucked out by a suction device so as to clean the second subassembly 60. This process does not require the use of any liquid and is thus advantageous in that the efforts for removing a liquid are not necessary.

In the air cleaning process the magnitude of the vibration and the impact to be applied is determined to be a level where the functions of the second subassembly 60 are not impaired. This is advantageous in that the functions of the disk drive device 100 are not deteriorated. A result obtained through experiment shows that the magnitude of the load, which is applied to the second subassembly 60 by the impact, of at most 200 G does not impair the functions of the second subassembly 60 and that the particles effectively come off when applied a load of at least 100 G. The purified air may be sprayed over the second subassembly 60 while the second subassembly 60 is in an upside-down state. The second subassembly 60 being in an upside-down state means a state where the surface of the hub 20, which is arranged on the base member 10, faces downward. This is advantageous in that the particles that came off are not likely to reattach to the surface of the second subassembly 60, which is sealed by a top cover. The purified air to be sprayed may be ionized air. This allows for the static electricity that is charged in the second subassembly 60 to be reduced, preventing the reattachment of particles.

The cleanliness level of the disk drive device 100 is, for example, evaluated by the number of particles of at least 0.5 μm per one square cm (hereinafter, referred to as LPC). The LPC is the number of particles existing in the purified water after irradiation of ultrasonic waves of 98 w at 68 kHz for 120 seconds when a device under test is immersed in a tank filled with 2000 cc of purified water. For example, a particle counter such as a CLS-700 or LS200 counter by Particle Measuring Systems, Inc., in the United States is used to count the number of the particles in the solution.

Figure 6:
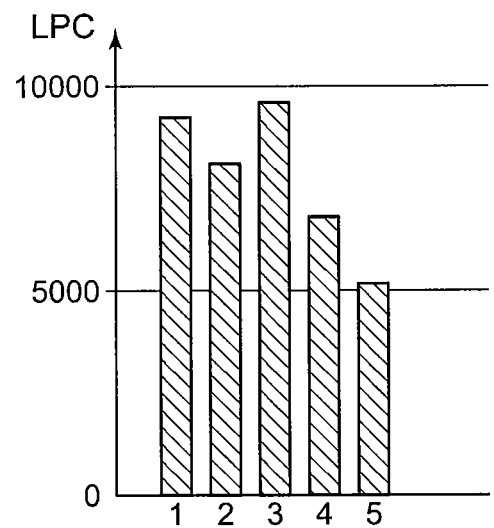
FIG. 6 is a view showing the cleanliness level the disk drive device produced by a conventional production method.
Figure 7:
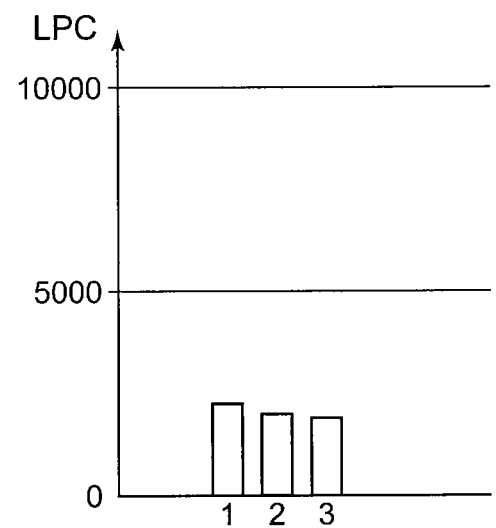
FIG. 7 is a view showing the cleanliness level the disk drive device produced by a production method of the disk drive device according to the embodiment.

FIG. 6 shows the cleanliness level the disk drive device produced by a conventional production method. FIG. 7 shows the cleanliness level the disk drive device 100 produced by a production method of the disk drive device 100 according to the embodiment. The cleanliness levels show in FIGS. 6 and 7 are represented by LPC.

The LPCs of five devices under test of a conventional disk drive shown in FIG. 6 vary from 5000 to 10000, and it is found to be difficult to have the number of LPC to be always at most 8000. On the other hand, a result is obtained showing that the LPCs of three devices under test of the disk drive device 100, produced by the production method of the embodiment, shown in FIG. 7 are as low as at most approximately 2000 with little variation.

As described above, the disk drive device, which can be obtained by the conventional production method, whose LPC ranges from around 5000 to 10000 comes with a huge individual variation in the number of particles. For this reason, a particle examination is necessary in an examination process of a disk drive device, requiring extra work effort. When a disk drive device having a large number of particles is found, the disk drive device is often used while reducing the rotation speed of the recording disk 120 so as to lower the probability of TA failure occurring. This often slows data loading.

On the other hand, the LPC of the disk drive device 100 produced by a production method of the disk drive device 100 according to the embodiment is at most 2000. In other words, the individual variation in the number of particles can be kept small. As a result, it is not necessary to reduce the rotation speed of the recording disk 120, and the high performance disk drive device 100 can thus be provided.

In the embodiment, the fixed-shaft disk drive device 100 is described as an example of a disk drive device. However, the inventive arrangement may also be applicable equally advantageously to produce a fixed-shaft disk drive device of a different structure.

Not only the aforementioned embodiment but the combinations of the elements of the embodiments will also be within the scope of the present invention. Various variations including design variations can be made to the embodiments by those skilled in the art and such variations are also within the scope of the present invention. The structure illustrated in each drawing is intended to exemplify an example, and the structure can be appropriately modified to a structure having a similar function, which can provide similar effects.

In the embodiment, the method of production in one clean room 101 is shown. However, each production process may be carried out in a clean room different from the clean room 101. For example, the first subassembly 50 may be assembled in a clean room different from the clean room 101 and then transferred to the clean room 101. The bearing unit 48 may also be assembled in another clean room.

Figure 8:
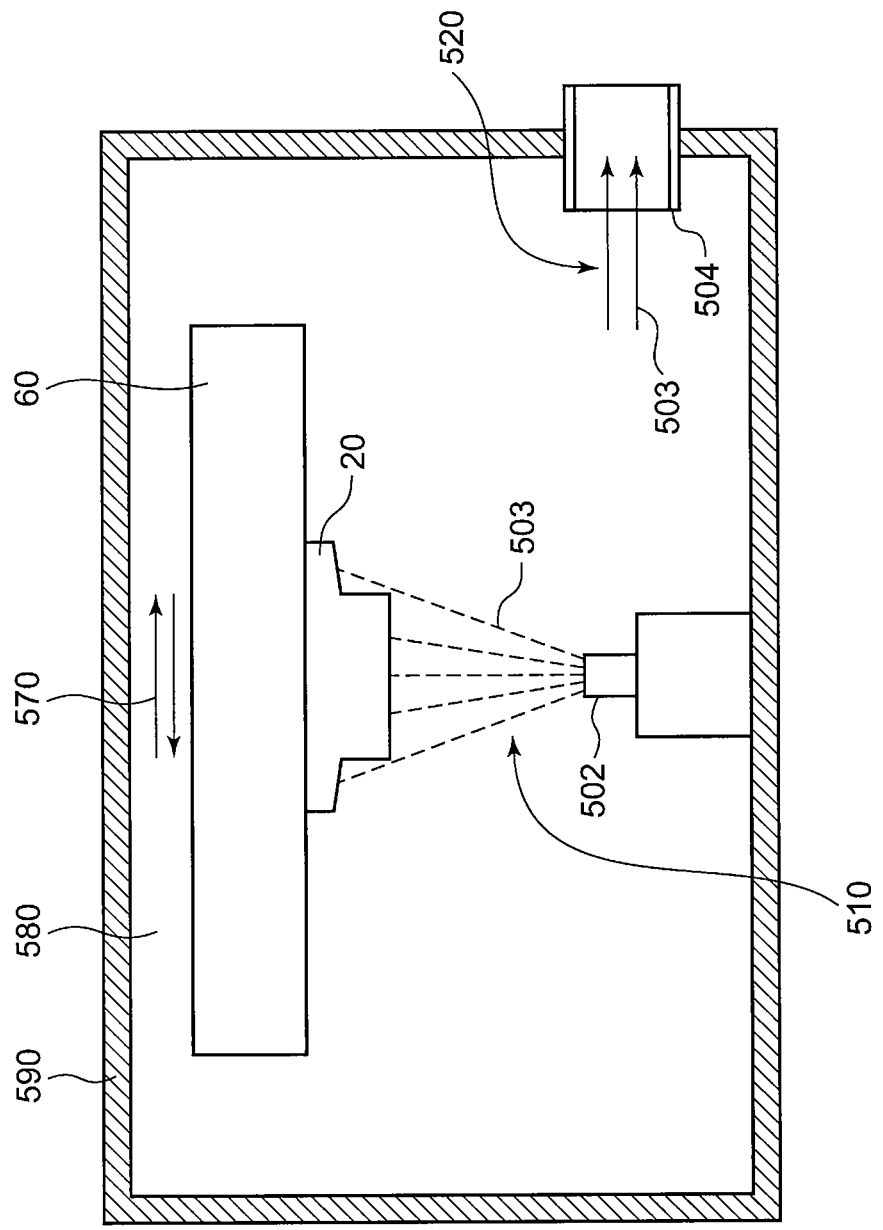
FIG. 8 is a view showing the cleaning of a hub of a second subassembly.

A description will now be given of an exemplary variation of the embodiment in FIG. 8. FIG. 8 is a view showing the cleaning of the hub 20 of the second subassembly 60. The second subassembly 60 in FIG. 8 is shown schematically, and, in particular, the hub 20 is shown in an enlarged manner compared to other members of the second subassembly 60. The cleaning-liquid discharging process 510 and the cleaning-liquid intake process 520 that are to be performed at this point are performed, in a space 580 defined by a wall member 590, between the subassembly assembling process 230 and the drying process 300 of the embodiment. The wall member 590 is arranged in the clean room 101.

In the cleaning-liquid discharging process 510, the second subassembly 60 is arranged such that the hub 20 faces downward, and a discharge port 502 is arranged below the hub 20. In other words, at least a part of the hub 20 and the discharge port 502 are arranged so as to overlap with each other in the vertical direction. The hub 20 facing downward means a state where the hub 20 is placed low while the base member 10 is placed highly and where the disk part in which the central hole 20*a* of the hub 20 is provided is placed low. The second subassembly 60 is supported by a predetermined support portion (not shown) from above. The support portion may support the second subassembly 60 by attaching the second subassembly 60 by using a suction disk or may hold the second subassembly 60 by using a crane. A cleaning liquid 503 is discharged from the discharge port 502 toward the hub 20. In the cleaning-liquid discharging process 510, for example, the cleaning liquid 503 may be mixed with air and discharged in a mist form. This is advantageous in that cleaning is performed by discharging the cleaning liquid 503 over a wide range of the hub 20.

The orientation of the hub 20 may be changed from the downward-facing orientation during the discharge of the cleaning liquid 503 toward the hub 20 in the cleaning-liquid discharging process 510. For example, the hub 20 is swung by the support portion in a horizontal direction while keeping the downward-facing orientation as shown by an arrow 570. The downward-facing orientation of the hub 20 may be changed to tilt during the discharge of the cleaning liquid 503 toward the hub 20. Setting the tilting angle of the hub 20 to be at least 20 degrees more or less with respect to the angle of the hub 20 facing downward in the vertical direction, which is set to be zero degree, is advantageous in that cleaning can be performed by discharging the cleaning liquid 503 over a wide range of the hub 20. Setting the tilting angle of the hub 20 to be 90 degrees more or less is preferred in that attachment of the cleaning liquid 503 to any parts other than the hub 20 can be prevented.

The cleaning liquid 503 turns to be mist or vapor after the cleaning of the hub 20 and floats inside the space 580. In the cleaning-liquid intake process 520, an inlet portion 504 is provided on a part of the wall member 590 so as to in-take the cleaning liquid 503 in a mist or vapor form with air and discharge the cleaning liquid 503 to the outside. The cleaning-liquid intake process 520 may be performed concurrently with the cleaning-liquid discharging process 510 or may be performed after the cleaning-liquid discharging process 510. The cleaning-liquid intake process 520 can prevent the cleaning liquid 503 from attaching to the second subassembly 60 excluding the hub 20.

What is claimed is:

1. A production method of a disk drive device comprising:
an assembling process to assemble a subassembly by incorporating at least a bearing unit in a hub in a clean room;
a pouring process to pour a lubricant in the bearing unit;
a cleaning-liquid discharging process to discharge a cleaning liquid onto the hub;
a cleaning-liquid intake process to in-take the cleaning liquid discharged onto the hub, wherein an inlet port for the cleaning liquid is arranged pointedly in a predetermined position of the hub and the cleaning liquid is taken in through the inlet port in the cleaning-liquid intake process; and
a sealing process to seal the subassembly inside a seal-material.

2. The production method of a disk drive device according to claim 1, wherein the hub is rotated when the cleaning liquid is discharged in the cleaning-liquid discharging process.

3. The production method of a disk drive device according to claim 2, wherein the rotating speed of the hub when the cleaning liquid is discharged is at least 100 r/m and at most a preset rotating speed during the practical operation of the disk drive device in the cleaning-liquid discharging process.

4. The production method of a disk drive device according to claim 1, wherein the hub is in a tilted state when the cleaning liquid is discharged in the cleaning-liquid discharging process.

5. The production method of a disk drive device according to claim 4, wherein the inclination angle of the hub is at least 5 degrees and at most 45 degrees in the cleaning-liquid discharging process.

6. The production method of a disk drive device according to claim 1, wherein the cleaning liquid is discharged so that the cleaning liquid reaches at least an area of the hub with which a recording disk comes into contact when the recording disk is mounted on the hub in the cleaning-liquid discharging process.

7. The production method of a disk drive device according to claim 1, wherein a discharge port for the cleaning liquid is arranged pointedly in a predetermined position of the hub and the cleaning liquid is discharged through the discharge port in the cleaning-liquid discharging process.

8. The production method of a disk drive device according to claim 1, wherein the hub is vibrated in the cleaning-liquid discharging process.

9. The production method of a disk drive device according to claim 1, wherein the inlet port is within a range of approximately 120 degrees from a discharge port used as a reference in a rotational direction of the hub, in the cleaning-liquid intake process.

10. The production method of a disk drive device according to claim 1 further comprising, after the cleaning-liquid discharging process, a process to spray air onto the subassembly.

11. The production method of a disk drive device according to claim 10, wherein an impact of at least 100 G and at most 200 G is applied to the subassembly in the process of spraying air.

12. The production method of a disk drive device according to claim 1 further comprising a process to count the number of particles attached to the disk drive device.

13. The production method of a disk drive device according to claim 1 further comprising, between the cleaning-liquid intake process and the sealing process, a drying process to dry the subassembly while heating the subassembly.

14. The production method of a disk drive device according to claim 13, wherein the subassembly is put in a high-temperature chamber whose internal temperature is kept between 60 and 120 degrees Celsius in the drying process.

15. The production method of a disk drive device according to claim 13, wherein a period in which the subassembly is kept in the high-temperature chamber is at least 60 minutes and at most 180 minutes in the drying process.

16. The production method of a disk drive device according to claim 1 comprising, between the cleaning-liquid intake process and the sealing process, an air-leakage checking process to check whether there is any air leakage in a seal area of the subassembly.

17. The production method of a disk drive device according to claim 16, wherein a predetermined space defined by the subassembly and a space defining member is filled with a gas containing helium, whose atmospheric pressure is higher than a predetermined atmospheric pressure, and wherein the speed of a decrease in the atmospheric pressure in the predetermined space is detected so as to check whether there is any air leakage in the subassembly based on the detected speed of a decrease in the atmospheric pressure, in the air-leakage checking process.

18. The production method of a disk drive device according to claim 1, wherein the boiling point of the cleaning liquid is at least 40 degrees Celsius and at most 90 degrees Celsius under atmospheric pressure in the cleaning-liquid intake process.

19. A production method of a disk drive device comprising:
an assembling process to assemble a subassembly by incorporating at least a bearing unit in a hub in a clean room;
a pouring process to pour a lubricant in the bearing unit;
a cleaning-liquid discharging process to discharge a cleaning liquid onto the hub from a discharge port;
a cleaning-liquid intake process to intake the cleaning liquid discharged onto the hub, wherein the hub is rotated when the cleaning liquid is discharged in the cleaning-liquid discharging process, such that the cleaning liquid moves toward an inlet port during the cleaning-liquid intake process; and
a sealing process to seal the subassembly inside a seal-material.

* * * * *